March 7, 1961 H. L. FISHER 2,974,226
ULTRAVIOLET ANALYZER

Filed Nov. 1, 1957 2 Sheets-Sheet 2

INVENTOR
H.L. FISHER
BY
Hudson & Young
ATTORNEYS

United States Patent Office 2,974,226
Patented Mar. 7, 1961

2,974,226
ULTRAVIOLET ANALYZER

Horace L. Fisher, Bartlesville, Okla., assignor to Phillips Petroleum Company, a corporation of Delaware Filed Nov. 1, 1957, Ser. No. 693,848

2 Claims. (Cl. 250—43.5)

This invention relates to an ultraviolet analyzer.

Ultraviolet analyzers are finding increasingly wide use in the monitoring and control of plant operations, especially in the petroleum industry. A need has arisen for an instrument capable of analyzing streams containing small amounts of aromatic compounds, such as toluene or benzene, particularly where the material to be analyzed is in the liquid phase.

In accordance with this invention, a unique combination of filters is provided. These filters are disposed in a beam of ultraviolet radiation passing from a source through a sample of the material to be analyzed to a detector unit. The filters permit liquid samples to be readily and accurately analyzed to quantitatively determine the presence of small amounts of aromatic hydrocarbons, such as benzene or toluene.

One filter has a pass band extending from a lower wavelength of about 230 millimicrons to an upper wavelength of greater than 275 millimicrons, for example, 420 millimicrons. This band of wavelengths encompasses several absorption peaks characteristic of benzene and toluene. Thus, the absorption of ultraviolet radiation at these wavelengths is representative of the amount of benzene or toluene in the sample. To avoid inaccuracies, the output signal is periodically compared with a standard signal. This is produced by passing the beam through the sample and band pass filter, and then through a filter which attenuates radiation having a wavelength lower than 250 to 260 millimicrons. Thus, the benzene or toluene in the sample does not affect the output produced when the beam is passed through the last-mentioned filter. This comparison produces an output representative of the benzene or toluene concentration in the sample independent of absorption variations in the ultraviolet region caused by other components which may be present in the sample, but which do not absorb in the benzene or toluene region of the spectrum.

As an optional feature of the invention, the beam can be further passed through a filter which cuts out the ultraviolet band above 270 millimicrons at all times, thus further minimizing the effect of interfering components.

Accordingly, it is an object of the invention to provide a new and improved filter system for ultraviolet analyzers.

It is a further object to provide a rapid, efficient method of analysis for aromatic hydrocarbons, such as benzene or toluene.

It is a still further object to accomplish the foregoing with apparatus of great simplicity, which is economical to build and operate.

Various other objects, advantages and features of the invention will become apparent from the following detailed description taken in conjunction with the accompanying drawings in which.

Figure 1:
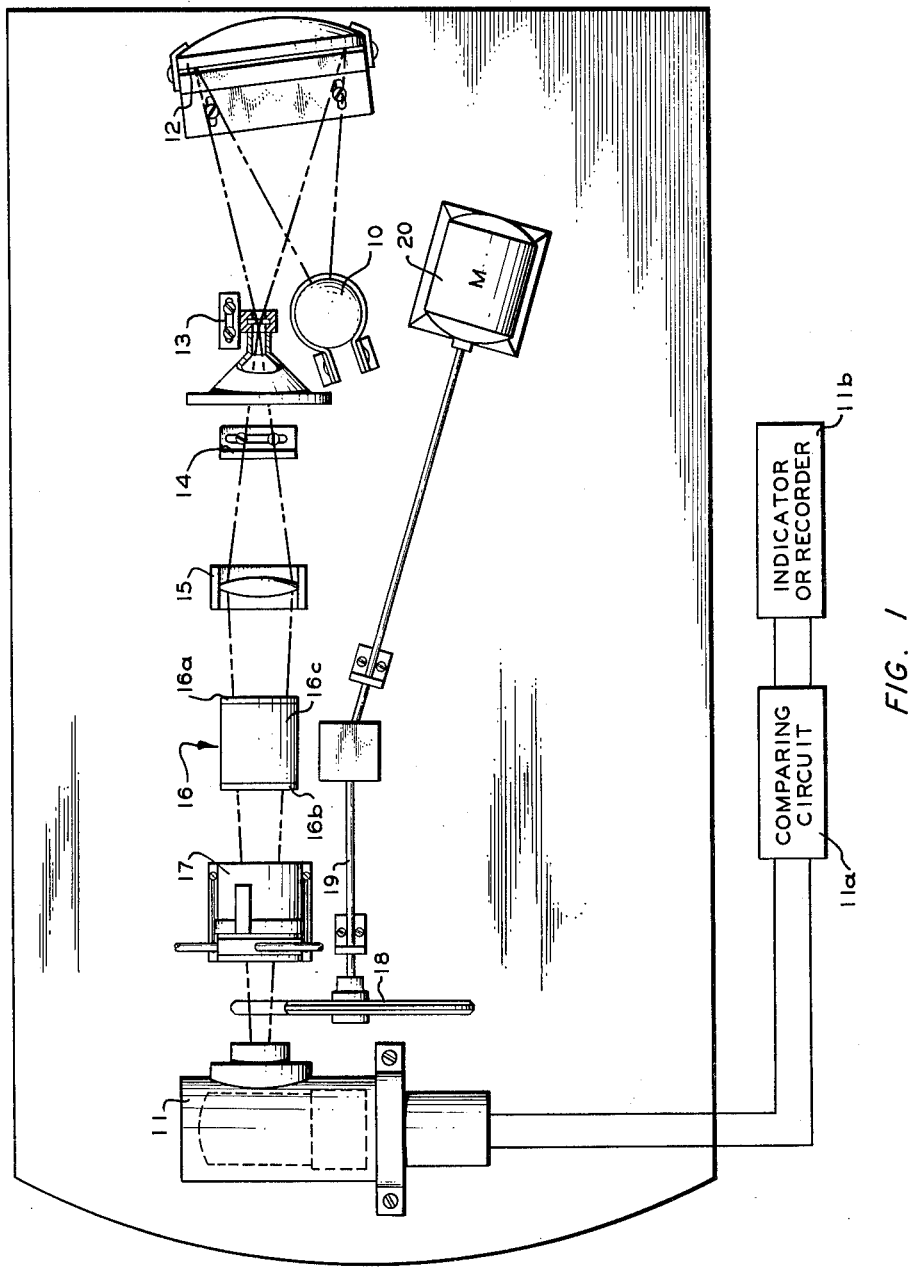
Figure 1 is a top view of an analyzer constructed in accordance with the invention.

Referring now to Figure 1 a beam of ultraviolet radiation from a source, such as a hydrogen lamp 10, is trained upon a detector unit 11 which can be a photomultiplier tube. The tube 11, in turn, is connected to a comparing circuit 11a and an indicator or recorder 11b.

In its passage from the source to the detector, the ultraviolet energy is collected by a mirror 12 and focused on an aperture assembly 13 which serves as a point source of ultraviolet radiation for the rest of the apparatus. From the aperture 13, the ultraviolet radiation traverses a filter 14, and a lens 15 which focuses the radiation upon the detector 11. Disposed in the path of the beam between the lens 15 and detector 11 are a gas filter 16, a sample cell 17, and a rotatable chopper 18 fixed on a shaft 19 which is driven by a motor 20.

As will become apparent hereafter, the cell 17 is adapted to contain a liquid sample of the material to be analyzed, and it is of adjustable length so that liquids of varying concentrations can be readily analyzed by a single instrument.

Figure 3:
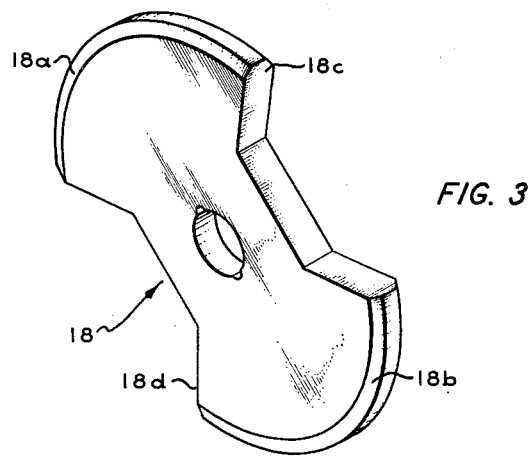
Figure 3 is a perspective view of the chopper disc.

As shown by Figure 3 the chopper 18 comprises a plurality of sector-shaped elements 18a, 18b formed from filter material which alternate with sector-shaped sections 18c, 18d of material transparent to ultraviolet radiation. In the example shown, the material is simply cut away to form the sectors 18a, 18b so that the transparent material is air.

In one specific embodiment of the invention, the filter material defining the sectors 18a, 18b attenuates radiation having a wavelength lower than about 250 to 260 millimicrons. Where the cut-off frequency is 250 millimicrons, the filter material can be a liquid thickness of ½ centimeter of carbon tetrachloride. Where a liquid filter material is used, it is incorporated within interior chambers, not shown, of the chopper disc which is formed from a radiation-transparent material such as quartz. Alternatively, the filter material can be of a type 9700 filter manufactured by the Corning Glass Works having color specification 9–53, cut to a thickness of 1 millimeter.

Where the cut-off wavelength is 260 millimicrons, a thickness of ¼ centimeter of carbon tetrachloride can be utilized or, alternatively, a 2-millimeter thickness of the aforementioned type 9700 filter having a color specification of 9–53.

The filter 14 is of the band pass type which passes wavelengths of about 230 millimicrons to an upper wavelength of greater than 275 millimicrons, for example, 420 millimicrons. Where a liquid-type filter is desired, a thickness of 5 centimeters of an aqueous solution containing 240 grams per liter nickel sulfate ($NiSO_4 \cdot 6H_2O$) and 45 grams per liter cobalt sulfate ($CoSO_4 \cdot 7H_2O$) can be utilized. The liquid is contained within a quartz liquid-containing cell transparent to ultraviolet radiation. Alternatively, the filter 14 can be a type 9863 filter produced by the Corning Glass Works having a color specification 7–54 and a thickness of 3 millimeters.

The auxiliary filter 16 which cuts off ultraviolet radiation of wavelength greater than 270 millimicrons, can be a 5 centimeter thickness of chlorine gas. As will become evident hereafter, this is an optional feature of the invention. Where used, the gas is contained within a cylindrical body 16a of opaque material having transparent end plates 16a and 16b.

Figure 2:
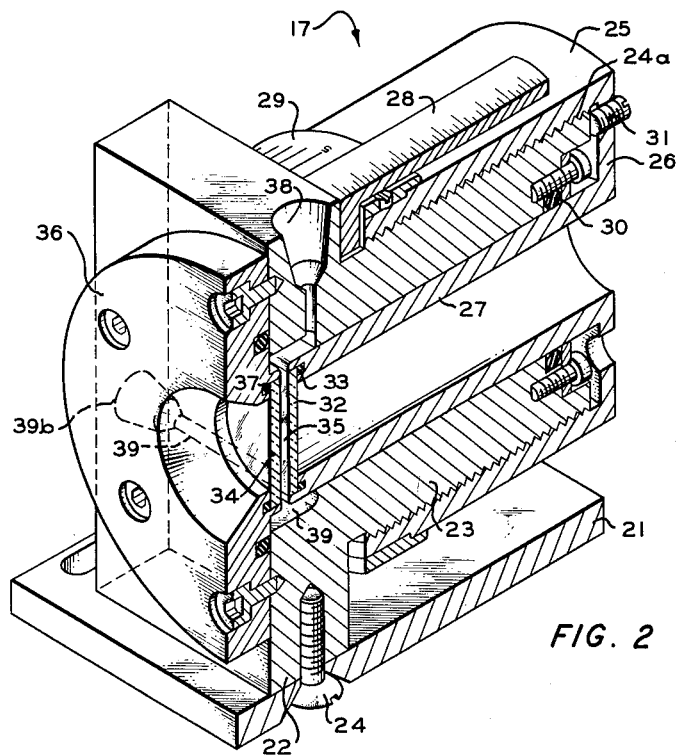
Figure 2 is a vertical sectional view of the sample cell, shown in perspective.

The detailed construction of the adjustable-width sample cell is shown by Figure 2. This unit includes a base 21 having a flanged portion 22 of a generally cylindrical body member 23 secured thereto by bolts 24. The outer cylindrical portion of the housing is threaded at 24a, and carries a rotatable sleeve member 25 formed integrally with an end portion 26 and an internal tubular portion 27. A scale 28 secured to the housing 23 cooperates with a ring scale 29 secured to the tubular member 25 to indicate the relative rotary movement and, hence, the axial displacement between the housing and tubular member. A gasket 30 seals the region between the inner surface of the housing and the tubular portion 27 while a machine screw 31 permits these parts to be maintained in any desired relative positions.

A disc 32 of quartz or other radiation transparent material is secured to the inner surface of the tubular portion 27 and sealed by a gasket 33. This disc cooperates with a similar disc 34 of radiation-transparent material to define the ends of a sample cell 35. The disc 34 is supported by a ring-shaped plate 36 and sealed by a gasket 37.

Cooperating with the seal 35 is a sample outlet 38 extending to the top portion of the cell through a suitable bore formed in the flange 22. In similar fashion, an inlet 39 for sample material cooperates with the lower portion of the cell 35 and communicates by a bore 39a in the flange 22 with an external connection 39b.

It will be apparent that the cell 35 is adapted to contain a liquid sample which passes from the inlet 39 through the cell to the outlet 38. Furthermore, the width of the cell can be adjusted at will merely by rotating the tubular member 25 upon the threads 24a of the housing 23. The rotary position of the tubular member 25 and, hence, the width of the cell is indicated by the scales 28, 29 and the screw 31 permits the tubular member 25 to be locked in any desired rotary position.

In the operation of one specific embodiment of the invention, Figure 1, the sample fed to the cell 17 contains a small amount of benzene which is to be quantitatively analyzed. Benzene has strong absorption bands at wavelengths of 225 to 270 mililmicrons. The filter 14 has a pass band extending from a lower wavelength of about 230 millimicrons to an upper wavelength of greater than 275 millimicrons. The filter 16 transmits wavelengths of less than 270 millimicrons and attenuates radiation of longer wavelength.

Accordingly, the filters 14, 16 in combination define a band pass filter extending from 230 to 270 millimicrons so that the ultraviolet radiation passing through the sample and the filter system varies in intensity in accordance with the amount of benzene in the sample.

The sectors 18a, 18b, Figure 3, are formed from material which attenuates radiation having a wavelength lower than a value of about 250 millimicrons and which passes radiation of higher wavelengths. Therefore, when one of the sectors 18a, 18b is positioned in the path of the radiation beam, the amount of radiation incident upon the detector 11 is not responsive to the benzene concentration of the sample. However, when the spaces between the sectors are in the path of the beam, the output is responsive to the benzene concentration. Thus, by electrically comparing these two outputs in the circuit 11a, a resultant signal is produced which is insensitive to absorption caused by miscellaneous components which may be in the sample and absorb at other wavelengths. The filter 16 aids by cutting out interference caused by absorption at ultraviolet wavelengths of greater than 270 millimicrons. Accordingly, the resultant output at unit 11b is responsive solely to the benzene concentration in the sample.

The described arrangement can also be used for analysis of toluene which has strong absorption bands at wavelengths of 225 to 275 millimicrons. However, when analyzing for small concentrations of toluene, somewhat greater sensitivity can be obtained by eliminating the chlorine gas filter 16, and changing the cut-off wavelength of the filter material in the chopper 18 to 260 millimicrons. In this manner, the absorption bands existing between the chlorine cut-off wavelength of 270 millimicrons and the upper wavelength limit of the toluene band, 275 millimicrons, contribute to the signal produced when the beam passes between the sectors of the chopper disc. By increasing the cut-off wavelength of the chopper disc material itself to 260 millimicrons, the toluene bands are sufficiently screened out of the detector output so that adequate compensation for interfering components is made when the output produced with the sectors 18a, 18b in the path of the beam is compared with the output produced when these sectors are not in the path of the beam.

The ultraviolet analyzer of the invention has many industrial applications, particularly in petroleum refining, for both monitoring and control purposes. In one process, a mixed hexanes stream is hydrogenated to convert small quantities of benzene which may be present to saturated material. The effluent from the hydrogenation step is analyzed with the present instrument to determine the proportion of benzene which is not converted in the reaction. The invention also has important application in separations where a normal hexane fraction is recovered as a bottom product in a distillation. Where small quantities of benzene are present, the benzene will distill with the normal hexane. Thus, by measuring the benzene concentration at a selected tray in the column, the amount of normal hexane at that tray can also be determined. This enables a suitable variable of the process, such as the heat input, feed rate, reflux rate or the like to be controlled to maintain a constant predetermined normal hexane concentration at the selected tray of the column. Various other applications of the novel ultraviolet analyzer will occur to those skilled in the art.

I claim:

1. An analyzer adapted to detect the presence of benzene and toluene comprising a source of ultraviolet radiation; a detector responsive to ultraviolet radiation; a sample cell; a first filter comprising an aqueous solution of nickel sulfate ($NiSO_4 \cdot 6H_2O$) and cobalt sulfate ($CoSO_4 \cdot 7H_2O$)

which has a band pass from a lower wavelength of about 230 millimicrons to an upper wavelength greater than about 275 millimicrons; a second filter of chlorine gas which is substantially transparent to radiation of wavelengths lower than about 270 millimicrons and substantially opaque to radiation of higher wavelengths; a rotatable chopper having a first sector transparent to ultraviolet radiation and a second sector comprising liquid carbon tetrachloride; and means for passing radiation from said source through said first filter, said second filter, said sample cell, and alternately through said first and second sectors to said detector.

2. The analyzer of claim 1 wherein said first filter comprises a 5 centimeter thickness of an aqueous solution containing 240 grams per liter of said nickel sulfate and 45 grams per liter of said cobalt sulfate, and said second sector comprises a ¼ to ½ centimeter thickness of said carbon tetrachloride.

References Cited in the file of this patent

UNITED STATES PATENTS

| 2,764,692 | Miller | Sept. 25, 1956 |
| 2,775,160 | Foskett et al. | Dec. 25, 1956 |
| 2,847,578 | Staten | Aug. 12, 1958 |